United States Patent [19]

Christensen et al.

[11] Patent Number: 5,054,800
[45] Date of Patent: Oct. 8, 1991

[54] BICYCLE TRAILER FOR SMALL CHILDREN

[76] Inventors: Linda B. Christensen; Brent R. Christensen, both of 47 Cuesta Way, Walnut Creek, Calif. 94596

[21] Appl. No.: 536,305

[22] Filed: Jun. 11, 1990

[51] Int. Cl.⁵ ............................................. B62K 27/06
[52] U.S. Cl. .................................... 280/204; 280/716
[58] Field of Search ............... 280/203, 204, 68, 70, 280/716; 248/610, 611; 267/73, 74

[56] References Cited

U.S. PATENT DOCUMENTS

| 2,581,809 | 1/1952 | Murray | 280/11.28 |
| 3,840,085 | 10/1974 | Smith | 280/204 |
| 4,674,762 | 6/1987 | Nelson et al. | 280/267 |
| 4,819,956 | 4/1989 | Campbell | 280/204 |

FOREIGN PATENT DOCUMENTS

| 615789 | 1/1927 | France | 280/204 |
| 168175 | 9/1921 | United Kingdom | 280/203 |
| 2168936 | 7/1986 | United Kingdom | 280/204 |

Primary Examiner—Charles A. Marmor
Assistant Examiner—Mitchell Bompey
Attorney, Agent, or Firm—Roger A. Marrs

[57] ABSTRACT

A bicycle trailer for transporting small children comprising a rigid, lightweight frame partially covered with fabric and provided with fabric sling seats for accommodating one or more small children. The wheels of the bicycle trailer are journaled on an axle the ends of which are mounted on vertical frame members for vertical sliding. The ends of the axle are resiliently coupled to the frame by elongated elastic members which pass over their associated ends of the axle and also pass around a boss which projects downwardly from the frame.

5 Claims, 2 Drawing Sheets

BICYCLE TRAILER FOR SMALL CHILDREN

BACKGROUND OF THE INVENTION

1. Field of the Invention.

The present invention relates to bicycle trailers, and more particularly to bicycle trailers adapted for carrying a plurality of small children over unpaved trails and pathways, and over rough ground such as open fields.

2. Description of the Prior Art.

Bicycle trailers are known in the prior art, both for carrying small children and for carrying items such as small packages, personal equipment, camping equipment, and the like.

In general, however, such prior art bicycle trailers have not been well adapted to the transporting of a plurality of small children, e.g., as many as three, and particularly have not been well adapted to "off-road" use, e.g., to carrying small children over unpaved paths and trails, and over open fields and the like.

The term "prior art" as used herein or in any statement made by or on behalf of applicants means only that any document or thing referred to as prior art bears, directly or inferentially, a date which is earlier than the effective filing date hereof.

No representation is made that a search has been made, or that no more pertinent information exists.

SUMMARY OF THE INVENTION

Accordingly, it is an object of our invention to provide bicycle trailers which are well adapted to the transporting of a plurality of small children, towed by a single-person bicycle.

Another object of our invention is to provide bicycle trailers which are particularly adapted to the "off-road" transporting of small children, i.e., the transporting of small children over unpaved paths and trails, or over open fields.

Yet another object of our invention is to provide bicycle trailers for plural small children, which bicycle trailers are simply and efficiently sprung by lightweight means which do not add substantially to the drawbar force required to be exerted by the towing cyclist.

An additional object of our invention is to provide bicycle trailers for plural small children, which bicycle trailers are sprung by lightweight means which minimize the risk of serious harm to the exploring fingers of a transported infant, such as would be presented by the employment of rigid metalic coil or leaf springs.

It is a further object of our invention to provide bicycle trailers which are sprung by lightweight means which provide "soft" coupling between the frame and the road wheels, as distinct from the mode of coupling provided by metalic coil springs or leaf springs.

It is another object of our invention to provide bicycle trailers for plural small children in which such lightweight means are quickly and easily adjustable to accomodate the total weight of one, two, or three small children of different ages and sizes.

It is a yet further object of our invention to provide bicycle trailers for plural small children, which bicycle trailers are easily assembled, disassembled, and repaired by those having limited or no skill in the bicycle art, without special instruction or elaborate documentation, and with no specialized tools.

It is another object of our invention to provide bicycle trailers for transporting plural small children, which bicycle trailers not only provide a comfortable ride in "off-road" conditions, but also protect the transported small children from inadvertant hand contact with the trailer wheels.

Yet another object of our invention is to provide a novel shock absorbing suspension system for a wide variety of vehicles, which shock absorbing suspension system is light in weight and quickly and easily adjustable to accomodate different loads without the use of tools, and without disassembling any part of the vehicle.

Other objects of our invention will in part be obvious and will in part appear hereinafter.

Our invention, accordingly, comprises the apparatus embodying features of construction, combinations of elements, and arrangements of parts exemplified in the following disclosure, and the scope of our invention will be indicated in the appended claims.

In accordance with a principal feature of our invention bicycle trailers for transporting small children are provided, which bicycle trailers are comprised of lightweight frames partially covered with fabric and provided with fabric sling seats for the individual small children to be transported.

In accordance with another principal feature of our invention each of said seats is also provided with suitable retaining belts for retaining the seated small child in seated position.

In accordance with yet another principal feature of our invention a bicycle trailer thereof is provided with wheels which are rotatably mounted upon an axle which is free to move over a limited linear range with respect to the frame of said bicycle trailer.

In accordance with a further principal feature of our invention said axle is resiliently coupled at each of its ends to the frame of the bicycle trailer of our invention by means of one or more elongated elastic members.

In accordance with a yet further principal feature of our invention each of said elongated elastic members can be quickly installed or removed from its operative position without tools and without disassembling any part of the bicycle trailer of our invention.

In accordance with an additional principal feature of our invention the elongated elastic members of the suspension system thereof are fabricated from material of the type sometimes referred to as bungee cord.

In accordance with another principal feature of our invention said elongated elastic members of this suspension system are provided in the form of closed loops.

In accordance with yet another principal feature of our invention more than one of said elongated elastic members can be installed at each end of said axle.

In accordance with yet another principal feature of our invention said suspension system is used in a wide variety of vehicles other than bicycle trailers for young children.

For a fuller understanding of the nature and objects of our invention, reference should be had to the following detailed description, taken in connection with the accompanying drawings.

DESCRIPTION OF THE PREFERRED EMBODIMENT

Figure 1:
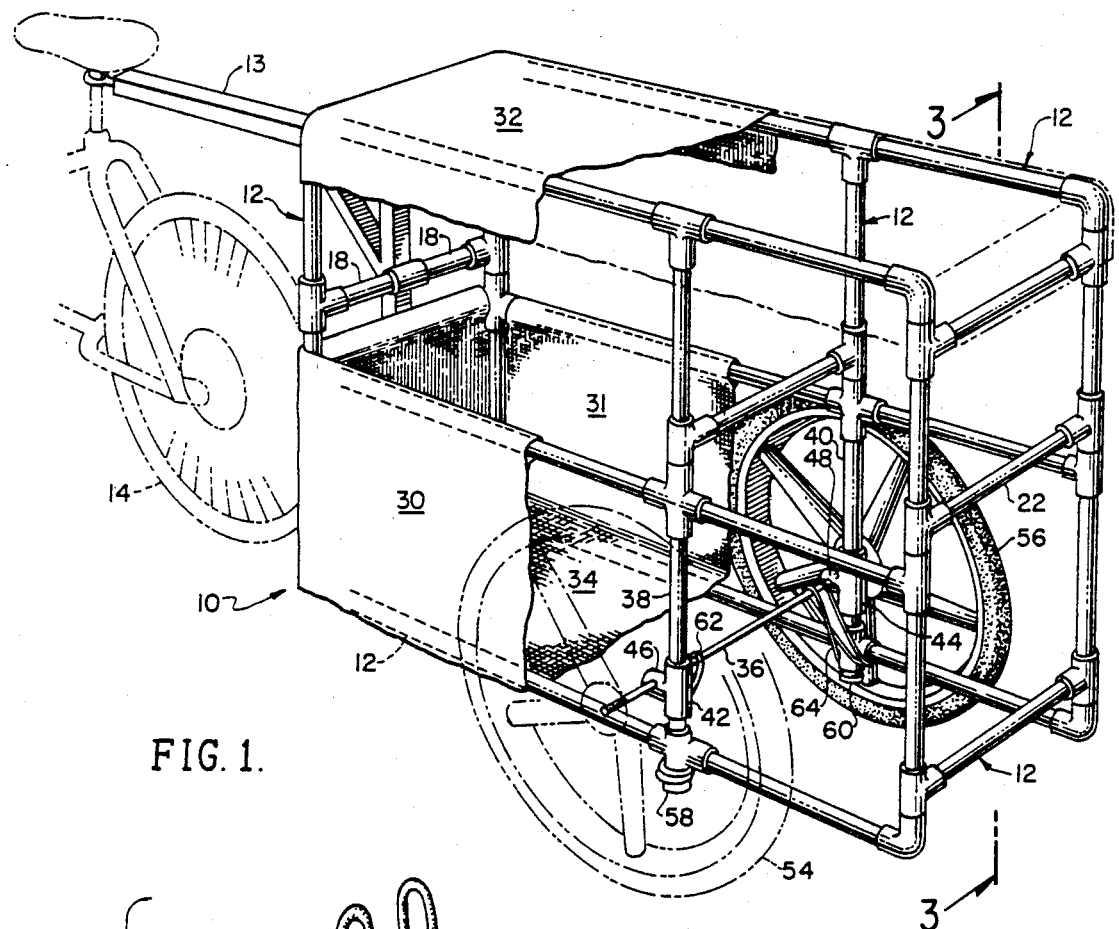
FIG. 1 is a partial perspective view, partly in phantom, of a bicycle trailer for small children constructed in accordance with the preferred embodiment of our invention.

Referring now to FIG. 1, there is shown a bicycle trailer for small children 10 which is constructed in accordance with the preferred embodiment of our invention.

As seen in FIG. 1, bicycle trailer 10 is comprised of a frame 12 which is fabricated from a plurality of pipes and pipe fittings of well known type, in the known manner.

In the preferred embodiment shown and described herein, the pipes and pipe fittings of frame 12 were cut and selected from common, commercially available polyvinylchloride (PVC) pipe. It is to be understood, however, that the frames of other embodiments of our invention may be fabricated from other types of pipes and pipe fittings. Alternatively, the frames of other embodiments of our invention may be fabricated from other materials, e.g., wood or metal, and may be fabricated from non-hollow members in whole or in part.

Yet further, the frames of other embodiments of our invention may be fabricated from two side panel members, e.g., cut from lightweight "honeycomb" material, which panels are joined by transverse rigid members and are provided with vertical rail members for carrying the axle in the manner hereinafter described.

Figures 3, 4:
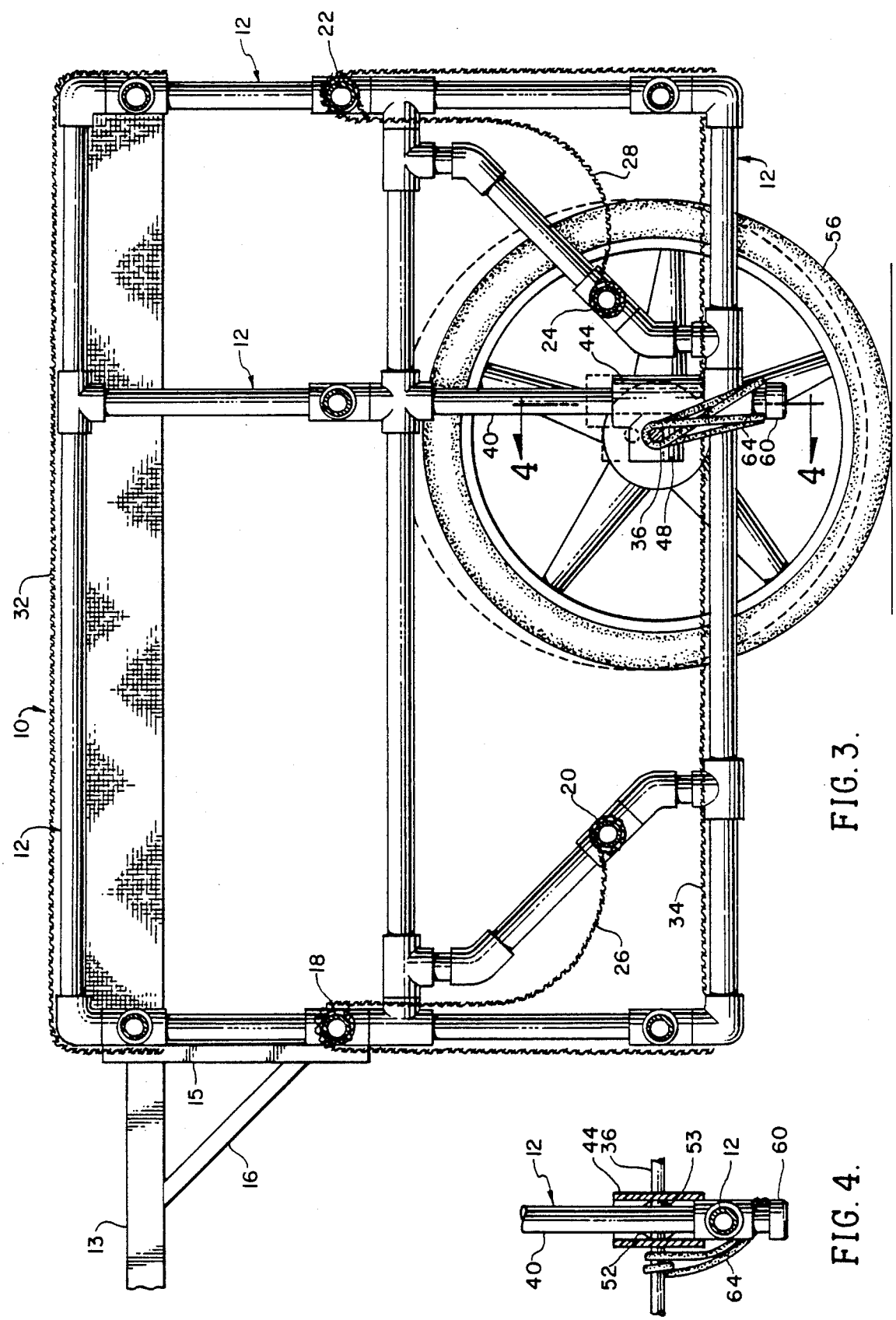
FIG. 3 is an elevational view in section of the bicycle trailer of our invention shown in FIG. 1, taken on plane 3—3 of FIG. 1.
FIG. 4 is a partial elevational view in section of the bicycle trailer of our invention, taken on plane 4—4 of FIG. 3.

As may be seen by comparison of FIGS. 1 and 3, bicycle trailer 10 is provided with a drawbar 13 which is provided with a vertically pivotable clamping device at its forward end, whereby drawbar 13 may be pivotably secured to the saddlepost of a bicycle 14.

As best seen in FIG. 3, the inner end of drawbar 13 adjacent to frame 12 is affixed to the upper end of a bracket 15.

As also seen in FIG. 3, a crossbrace 16 is disposed between drawbar 13 and bracket 15. Crossbrace 16 is affixed at its opposite ends to drawbar 13 and bracket 15, respectively.

The upper and lower ends of bracket 15 are secured, respectively, to two transverse members of frame 12.

Thus, it will be understood by those having ordinary skill in the art, informed by the present disclosure, that bicycle trailer 10 is adapted to be drawn by a bicyclist operating a bicycle 14 by means of drawbar 13, which is affixed to the saddlepost of bicycle 14.

Referring again to FIG. 3, it will be seen that frame 12 includes a first pair of transverse members 18, 20, and a second pair of transverse members 22, 24.

As also seen in FIG. 3, a fabric member 26 is wrapped at one end around transverse member 18, and is wrapped at the other end around transverse member 20.

The respective ends of fabric member 26 are secured to transverse members 18, 20, respectively, as by having longitudinal transverse pockets sewn therein, which longitudinal transverse pockets receive transverse members 18, 20, respectively.

The width of fabric member 26 is such that it extends substantially from side to side of frame 12.

As indicated in FIG. 3, fabric member 26 is not drawn taut between transverse members 18, 20, but rather is sufficiently greater in length than the minimum distance between transverse members 18, 20 so that it forms a sling seat for a small child riding in bicycle trailer 10.

In the preferred embodiment sling seat 26 is provided with a suitable seatbelt, engaged with suitable elongated apertures in sling seat 26, whereby the small child seated therein may be secured to sling seat 26 for safety.

As will now be understood by those having ordinary skill in the art, informed by the present disclosure, a fabric sling seat 28 is also provided, which is suspended between transverse members 22, 24 in the same manner in which sling seat 26 is suspended between transverse frame members 18, 20.

In accordance with the second preferred embodiment of our invention, a second rearwardly facing seat, substantially identical in construction to sling seat 26, may be provided. The provision of the necessary additional transverse members, the fabric seat member, etc., for this additional rearwardly facing seat is within the scope of those having ordinary skill in the art, informed by the present disclosure.

It will be understood, then, that the bicycle trailer of our invention may be adapted to the transportation of one, two, or three small children, all within the scope of our invention.

Comparing FIGS. 1 and 3, it will be seen that frame 12 is provided with fabric side panels 30, 31, a fabric top 32, and a fabric floor 34.

As best seen in FIG. 1, particular edges of these panels are affixed to frame 12 by means of edge portions thereof which are passed around horizontal members of frame 12 and secured thereto, as by sewing extreme edges of these panels to inner portions thereof, and thus providing elongated pockets in which these horizontal members are respectively received.

Figure 2:
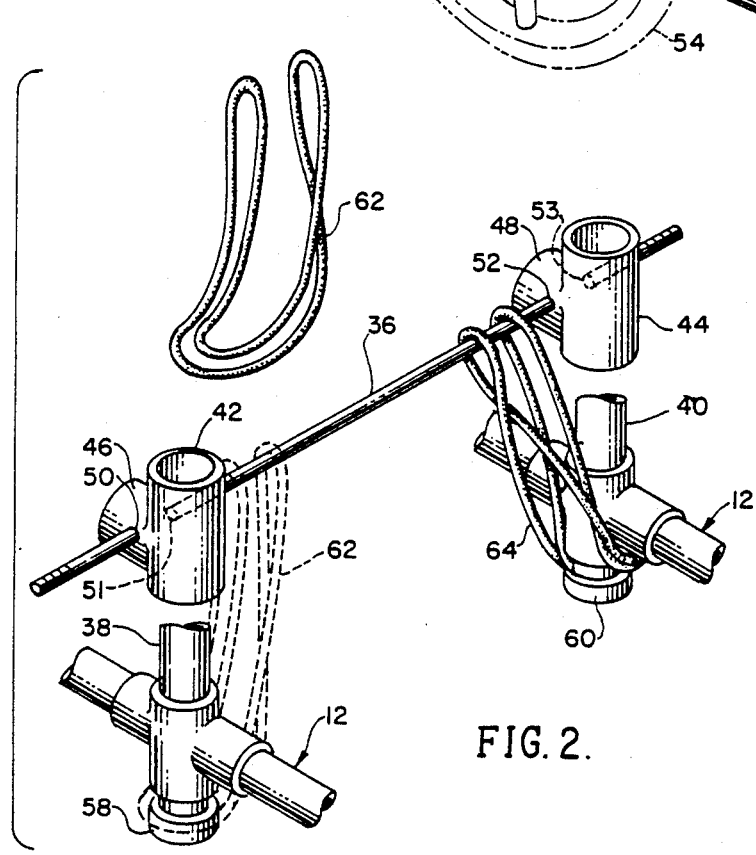
FIG. 2 is a partial perspective view, partly in phantom, of the suspension system of the bicycle trailer of our invention shown in FIG. 1.

As described hereinafter, frame 12 is provided with an axle 36 the opposite ends of which are vertically slidably mounted on vertical frame members 38, 40 by means of collars 42, 44. Collars 42, 44 are provided respectively with offset members 46, 48. As best seen in FIG. 2, offset members 46, 48 are provided respectively with aligned openings 50, 52 through which axle 36 passes.

Comparing FIGS. 2, 3, and 4, it will be seen that frame 12 is comprised of a vertical member 40 on which is slidably mounted a collar 44. It will also be seen that collar 44 is provided with a hollow offset member 48 through which pass a pair of aligned holes 52, 53, axle 36 passing through both of the aligned holes 52, 53.

Similarly, (FIG. 2) the opposite end of axle 36 is slidably mounted on vertical frame member 38 by means of a collar 42 which is itself provided with a hollow offset member 46 through the sidewalls of which pass a pair of aligned openings 50, 51.

Thus, it will be understood by those having ordinary skill in the art, informed by the present disclosure, that axle 36 of the bicycle trailer of the first preferred embodiment is vertically slidably mounted on two vertical frame members 38, 40.

The two fabric panels 30, 31 are provided with vertical slits through which the outer ends of axle 36 project. By this arrangement the small children riding in bicycle trailer 10 are protected from accidental contact with the wheels of bicycle trailer 10.

As may be seen by comparison of FIGS. 1 and 3, the wheels 54, 56 of bicycle trailer 10 are respectively journaled on the opposite ends of axle 36, by means of well known commercially available bearings.

While wheels 54, 56 as illustrated are of the now well known type having but a few spokes, it is to be understood that bicycle wheels of the long well known type having a much larger plurality of wire spokes may also be employed in certain embodiments of our invention.

Referring again to FIG. 2, it will be seen that, in accordance with a principal feature of our invention, downwardly projecting bosses or similar protuberances 58, 60 are provided directly below and in alignment with the vertical members 38, 40, respectively.

As also seen in FIG. 2, a closed loop 62 of elastic cord, preferably of the type called "bungee cord", is passed over axle 36, and its two lower end loops are passed around boss 58.

Thus, it will be seen that axle 36 is resiliently coupled to frame 12 by a closed loop of bungee cord 62; and that the opposite end of axle 36 is resiliently coupled to frame 12 by means of a closed loop 64 of bungee cord.

It is to be noted as a particular feature of our invention that elongated elastic members 62, 64 can both be installed in operative position on bicycle trailer 10 without tools, and without disassembling any portion of bicycle trailer 10.

This can be accomplished by simply draping bungee cord loop 62 over axle 36 closely adjacent collar 42, with its two looped ends located closely adjacent boss 58, and then manually passing both of these looped ends around boss 58.

Similarly, bungee cord loop 64 can be installed by simply draping it over axle 36 so that its two looped ends depend downwardly closely adjacent boss 60, and then manually passing both of these looped ends around boss 60.

It is to be noted as a principal feature of our invention that both boss 58 and boss 60 are of sufficient length to accomodate the looped ends of not one but two bungee cord loops, whereby the strength of the suspension may be adjusted to accomodate one, two, or three small child riders.

While the elongated elastic loop members 62, 64 of the preferred embodiment are fabricated from bungee cord, it is to be understood that our invention is not limited to the employment of that particular elastic cord material.

Further, it may be found desirable in certain instances to employ bungee cord of the well known type, and joining the wire hooks at the ends thereof by deforming and thus closing those hooks.

Yet further, it may be found desirable in some instances to employ more than one or two elongated elastic loops.

It is further to be understood that the suspension system of our invention may be employed in other vehicles, including self-propelled vehicles. Also, the axle of the suspension system of our invention may be pivotable about an axis parallel to itself by means of pivoted arms, rather than being slidable.

It will thus be seen that the objects set forth above, among those made apparent from the preceding description, are efficiently attained, and since certain changes may be made in the above constructions without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention hereindescribed, and all statements of the scope of the invention which, as a matter of language, might be said to fall therebetween.

What is claimed is:

1. A trailer occupied by personnel intended to be drawn behind a pulling vehicle, the trailer comprising:
   a frame having upright members in fixed spaced-apart relationship;
   an axle slideably carried on said upright members for vertical movement on said upright members with respect to said frame;
   stretchable elastic loops resiliently joining said axle to said frame;
   said frame further having protuberances fixed on said frame in vertical alignment with said upright members; and
   each of said elastic loops having opposite ends defining a midsection whereby said axle passes through said loop ends and said midsection passes about said protuberance respectively.

2. The invention as defined in claim 1 wherein:
   each of said elastic loops are composed of a stretchable and expandable material.

3. The invention as defined in claim 2 including:
   collar members slideably carried on each of said upright members; and
   each collar member having an offset member laterally projecting from said collar member with an opening extending therethrough for rotatably receiving and mounting said style.

4. The invention as defined in claim 3 wherein:
   said frame includes a pair of spaced-apart horizontal support members supporting said upright members in fixed spaced parallel relationship;
   said protuberances fixed to said support members so that said protuberances lie on the central longitudinal axis of each of said upright members respectively;
   said protuberances providing a stud terminating in a free end about which respective elastic loop midsections are trained.

5. The invention as defined in claim 2 including:
   fabric covering means covering a portion of said frame defining an enclosure to accommodate occupants and a plurality of sling seat means carried on said frame within said enclosure.

* * * * *